United States Patent [19]

Shibata et al.

[11] Patent Number: 5,100,298
[45] Date of Patent: Mar. 31, 1992

[54] CONTROLLER FOR UNDERWATER PUMP

[75] Inventors: Tomoyuki Shibata; Noboru Hokimoto, both of Kanagawa, Japan

[73] Assignee: Ebara Corporation, Tokyo, Japan

[21] Appl. No.: 489,101

[22] Filed: Mar. 6, 1990

[30] Foreign Application Priority Data

Mar. 7, 1989 [JP] Japan .................... 1-25999

[51] Int. Cl.$^5$ ............................. F04B 49/06
[52] U.S. Cl. ................... 417/40; 417/423.3; 417/423.14; 417/423.7; 310/71
[58] Field of Search ............ 417/36, 40, 423.3, 423.7, 417/423.14; 310/71

[56] References Cited

U.S. PATENT DOCUMENTS

| | | | |
|---|---|---|---|
| 3,568,121 | 3/1971 | Nash | 417/36 |
| 3,761,750 | 9/1973 | Green | 310/87 |
| 3,992,130 | 11/1976 | Childress | 417/36 |
| 4,053,196 | 10/1977 | Dunaway | 310/87 |
| 4,171,186 | 10/1979 | Chapman | 417/40 |
| 4,339,231 | 7/1982 | Conery et al. | 310/71 |
| 4,387,313 | 6/1983 | Yamamoto et al. | 310/71 |
| 4,441,860 | 4/1984 | Tsujimoto | 417/40 |
| 4,808,865 | 2/1989 | King | 73/116 |
| 4,961,081 | 10/1990 | Akhter | 417/422 |

FOREIGN PATENT DOCUMENTS 2633794 2/1978 Fed. Rep. of Germany .
3642727 6/1988 Fed. Rep. of Germany .
58-110879 7/1983 Japan .

Primary Examiner—Richard A. Bertsch
Assistant Examiner—David W. Scheuermann
Attorney, Agent, or Firm—Oblon, Spivak, McClelland, Maier & Neustadt

[57] ABSTRACT

A controller for an underwater pump which operates to start and stop the pump in response to a water level detected by a water level sensor is disclosed. The controller (10) is constituted as a separate component which comprises a watertight case (11), a first connector (13) provided at a first predetermined position of the case for installation on a power connector (12) provided at a pump casing (51), a second connector (14) provided at a second predetermined position on the case, on which an external power connector (15) is to be installed, electronic parts and units (18, 19, 20) constituting a control circuit installed in the case for starting and stopping the pump based on signals output from the water level detection sensor ($S_1$, $S_2$, $S_3$), and a cable (22) watertightly derived from the case externally for electrically connecting the control circuit and the water level sensor. The pump may be operated in an automatic operation mode. However, by removing the controller from the pump casing and the external power connector and by directly connecting the external power connector to the power connector of the pump, the pump may be converted to a non-automatic operation mode.

9 Claims, 5 Drawing Sheets

CONTROLLER FOR UNDERWATER PUMP

BACKGROUND OF THE INVENTION

1. Field of the Invention

The present invention relates to a controller for an underwater pump which operates to start and stop the pump in response to a water level.

2. Description of the Prior Art

A conventional automatic/non-automatic converting underwater pump equipped with such a controller, for example, is disclosed in Japanese Patent Disclosure No. 58-110879. FIG. 5 shows the case where the underwater pump of this type operates in an automatic mode, wherein power is supplied to the underwater pump A through a power cord 52, whereby a motor enclosed in a pump casing 51 is actuated to drive the pump, and water sucked in from a suction port 53 is pumped out of a discharge port 54. A holder 59 for fixing a pole 58 on which float switches 56, 57 for detecting a water level are mounted, is fixed on an outlet portion 55 of the power cord 52, and a controller for supplying and suspending the supply of power to the motor in response to a detected level on the float switches 56, 57 and thereby starting and stopping the pump is enclosed in the holder 59.

However, in the aforementioned underwater pump, there was a problem such that mounting a controller on a pump involved a difficult and troublesome operation in connecting a wiring 60a of the controller enclosed in the holder 59 and a core 52a of the power cord 52, a wiring 60b of the controller and a terminal wire 61a of the motor, and a terminal wire 61b of the motor and a core 52b of the power cord 52.

Further, in the case of the aforementioned underwater pump being converted to operate in a non-automatic mode, a procedure for switching from automatic to non-automatic mode also required a troublesome and time consuming operation for demounting the holder 59 and then re-connecting the core 52a of the power cord 52 and the terminal wire 61a of the motor and the terminal wire 61b of the motor and the core 52b of the power cord 52.

SUMMARY OF THE INVENTION

Therefore, an object of the present invention is to provide a controller for an underwater pump which operates to start and stop a pump in response to a water level detected by a water level sensor, which does not require a troublesome and time consuming wiring operation to connect the controller, a motor of the pump and an external power cord supplying power to the motor.

Another object of the present invention is to provide a controller as stated above which does not require any wiring operation to be carried out upon switching the pump from automatic to non-automatic operating mode, or vice versa.

A further object of the invention is to provide a controller as stated above, which enables electrical connection and disconnection between the controller, a motor and an external power cord by means of a single attachment.

Still another object of the invention is to provide a controller as stated above, which does not require a change in pump casing for different operation modes of the pump.

To accomplish aforementioned objects, a controller according to the present invention is constructed as a separate component which comprises a watertight case, a first connector provided at a first predetermined position on the watertight case for connection to a power connector provided on a pump casing, a second connector provided at a second predetermined position on the watertight case for installing an external power connector thereon, electronic parts and units constructing a control circuit installed in the watertight case for starting and stopping the underwater pump based on signals output from a water level detection sensor of the controller and a cable derived from the case externally in a watertight manner for electrically connecting the control circuit and the water level detection sensor.

In the controller for an underwater pump as constructed above, since the controller is produced as a separate component from a pump casing and a water level sensor holding member, by incorporating or removing in a single action the controller for an underwater pump in or out of the pump casing at the site, the underwater pump may be easily made ready for operating selectively in either an automatic or non-automatic mode according to requirements, and thus a complicated and time consuming operation required for effecting different wirings in the case with the prior art is no longer necessary.

These and other objects of the present invention will become apparent from the detailed description of the invention set forth hereafter.

DETAILED DESCRIPTION OF THE PREFERRED EMBODIMENTS

A preferred embodiment of the present invention will now be described with reference to the accompanying drawings.

Figure 1:
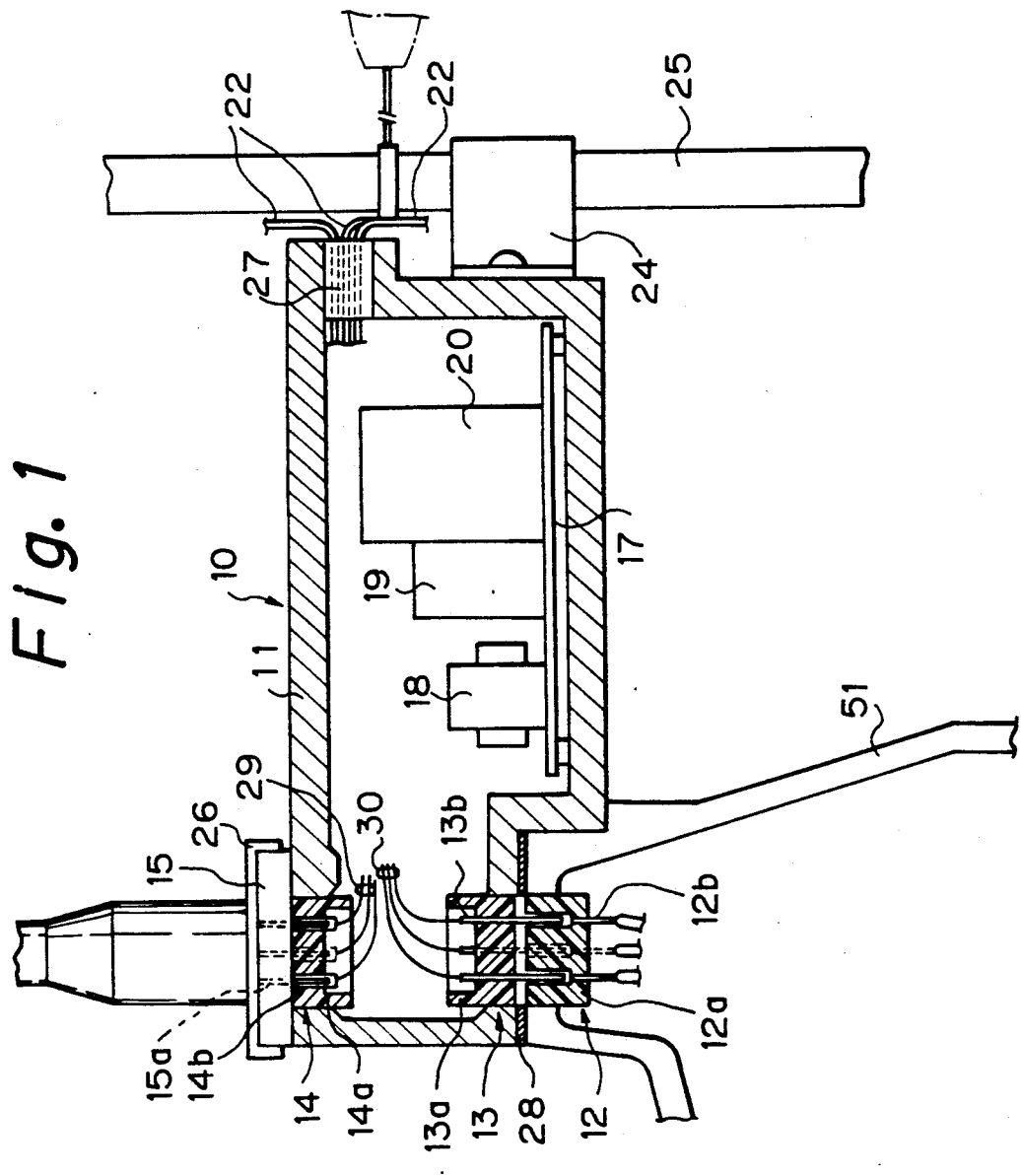
FIG. 1 is a sectional view showing a state where a controller for an underwater pump according to one embodiment of the invention is incorporated in an underwater pump.

FIG. 1 is a sectional view showing a state wherein a controller for an underwater pump according to the invention is incorporated in an underwater pump. As illustrated, a controller for an underwater pump 10 comprises a watertight case 11, and a circuit board 17 and various electronic parts and units 18, 19, 20 comprising a control circuit for starting and stopping the pump in response to a water level detected on a water level sensor are enclosed in the case 11. The case 11 is provided with a first connector 13 ready for installing on a power connector 12 provided at a predetermined position of a pump casing 51, and a second connector 14 on which an external power connector 15 is ready for installation.

The power connector 12 is structured to have female terminal pins 12b fixed through a connector body 12a consisting, for example, of resin material or the like, and the connector body 12a is mounted on the pump casing 51 in a watertight manner. The first connector 13 is structured to have male terminal pins 13b fixed through a connector body 13a consisting of a resin material or the like so as to be inserted in the female terminal pins 12b of the power connector 12. The second connector 14 is structured to have female terminal pins 14b fixed through a connector body 14a consisting of a resin in which male pins 15a of the external power connector 15 are inserted. The first connector 13 and the second connector 14 are mounted in a watertight manner on the case 11 each. A packing 28 is interposed between the case 11 of the controller 10 and the pump casing 51, and the external power connector 15 consists of a rubber material or an elastic resin to seal the terminal pins. A rigid cover 26 is put on an end collar portion of the external power connector 15, and the external power connector 15 and the case 11 are fastened and fixed on the pump casing 51 with bolts or the like (not indicated), thereby maintaining watertightness between the external power connector 15 and the case 11 and also between the case 11 and the pump casing 51.

Alternatively, the external power connector 15 may be formed of a hard resin material, and a packing for maintaining watertightness may be interposed between the case 11 and the external power connector 15.

Figure 5:
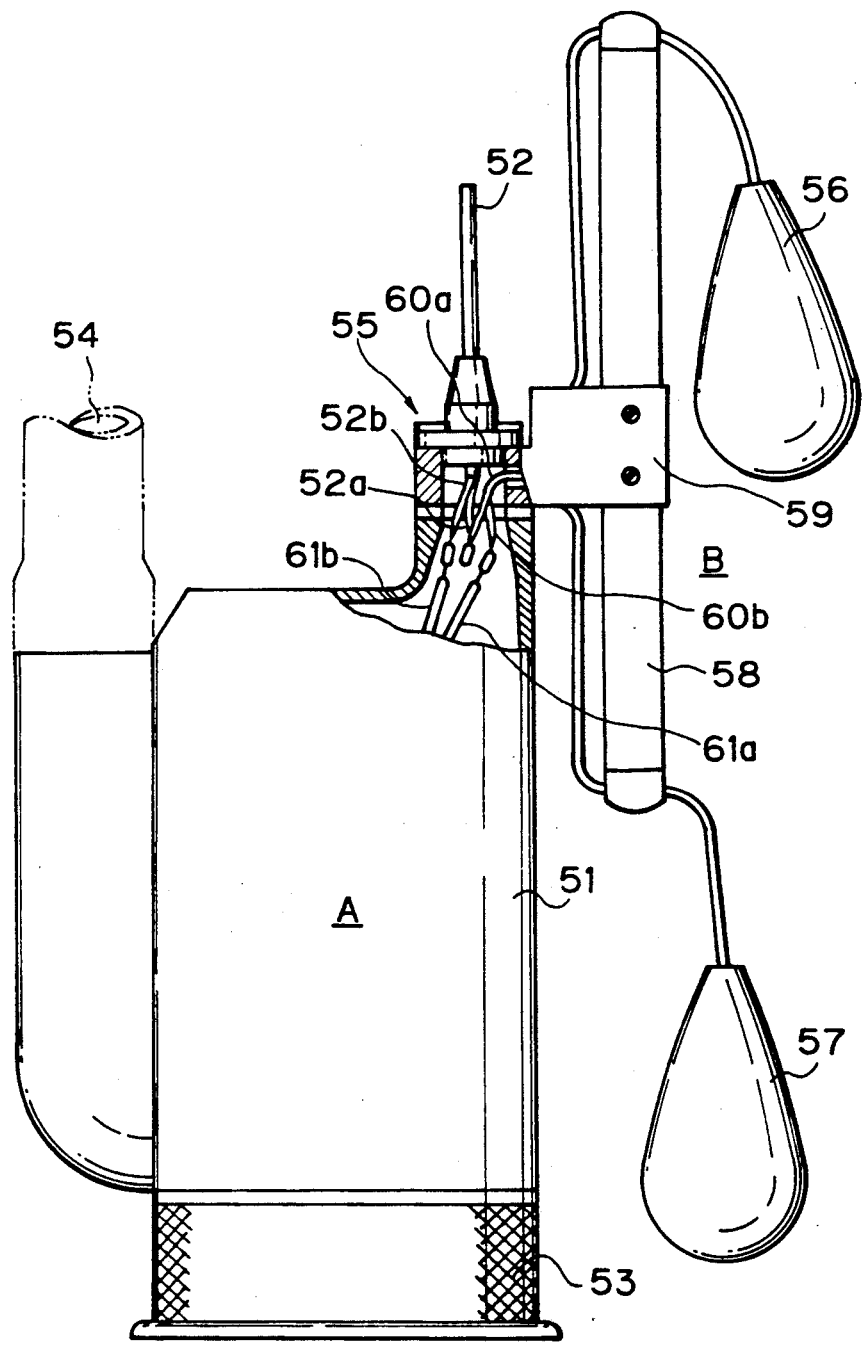
FIG. 5 is a drawing showing an example of a prior art automatic underwater pump.

A deriving member 27 for deriving in watertightness manner externally a cable 22 for connecting the control circuit and the water level detection sensor (float switches 56, 57 of FIG. 5) is provided on a side of the case 11 of the controller for underwater pump 10. A cable 29 for supplying power to various electronic parts and units 18, 19, 20 in the case 11 is connected to the terminal pins 14b of the second connector 14, and a cable 30 for feeding a power to a motor disposed in the pump casing 51 is connected to the terminal pins 13b of the first connector 13.

Since the controller for an underwater pump 10 constructed as above is made as a separate component from the pump casing 51 and others, when operating the underwater pump in automatic mode, the controller for underwater pump 10 is mounted on the pump casing 51 as indicated in FIG. 1, thereby the underwater pump may be operated automatically.

Figure 2:
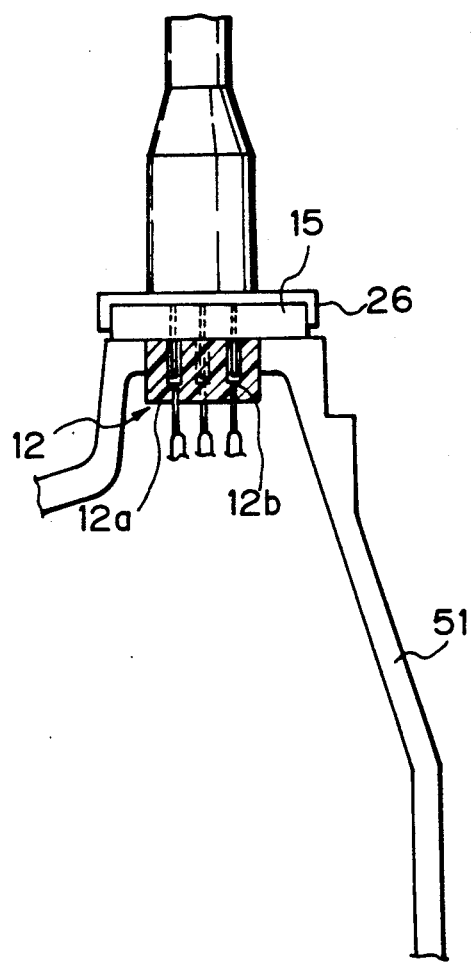
FIG. 2 is a fragmentary sectional view showing connection between an external power connector and a pump casing when operating the underwater pump in non-automatic mode.

In case the underwater pump is operated in non-automatic mode, the external power connector 15 is directly installed on the power connector 12 of the pump casing 51 with the cover 26 put thereon and the external power connector 15 is fixed on the pump casing 51 with bolts or the like (not indicated) as shown in FIG. 2, thereby operating the underwater pump in a non-automatic mode.

Figure 3:
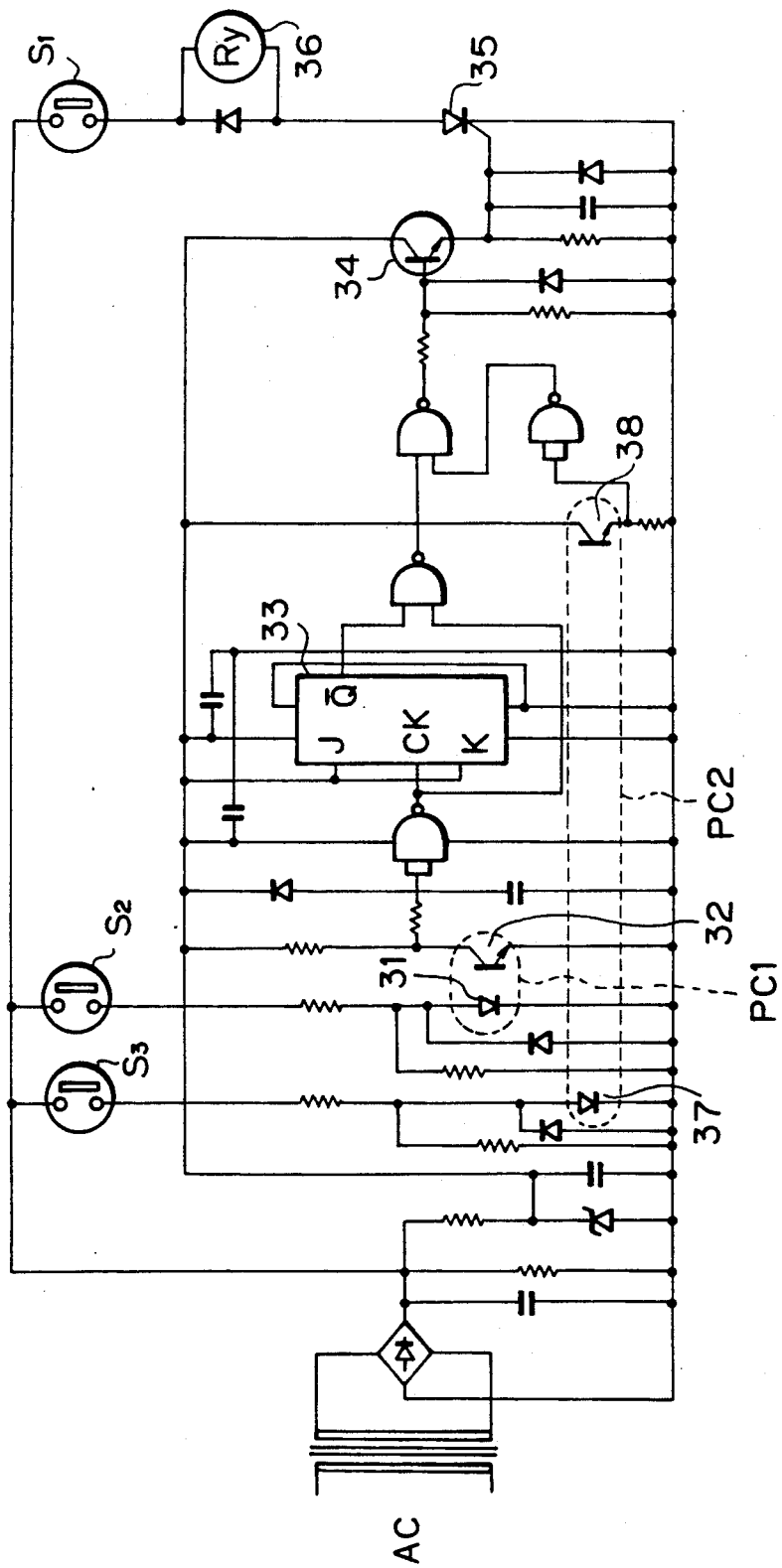
FIG. 3 is a diagram showing an example of a control circuit for the controller for underwater pump.
Figure 4:
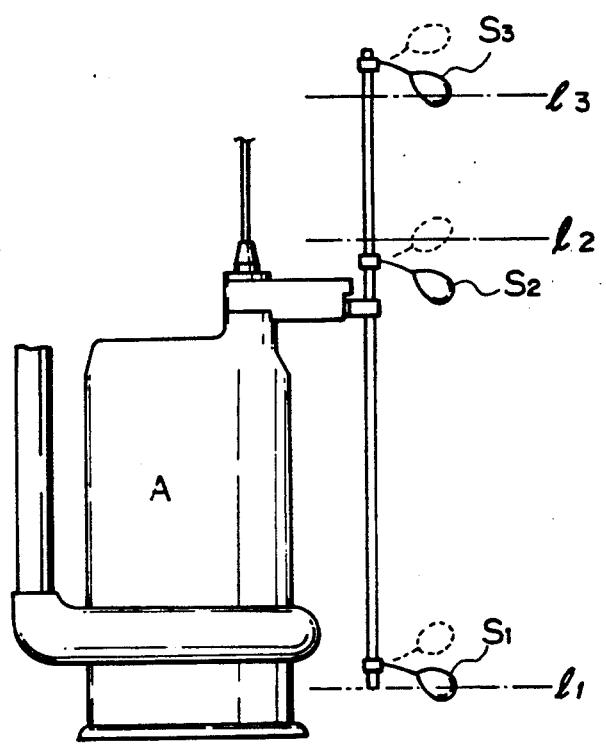
FIG. 4 is a drawing showing the underwater pump and levels detected on water level sensor.

FIG. 3 shows a constructional example of a control circuit of the controller for an underwater pump 10, and FIG. 4 shows an underwater pump and water levels detected on water level sensors. In FIG. 4, the detected water levels include a lower level $l_1$, a middle level $l_2$ and an upper level $l_3$. The water level sensor $S_1$ is set to detect the lower level $l_1$, the water level sensor $S_2$ is set to detect the middle level $l_2$ and the water level sensor $S_3$ is set to detect the upper level $l_3$. In FIG. 4, the water level sensors $S_1$, $S_2$, $S_3$ using a float switch each are exemplified, however, the water level sensors are not necessarily limited to float switches.

In FIGS. 3 and 4, if water is fed into a water tank, for example, where the underwater pump is provided and when the water level comes to the lower level $l_1$, the water level sensor $S_1$ is turned on. When the water level rises to reach the middle level $l_2$, the water level sensor $S_2$ is turned on. A light emitting diode 31 constructing a photocoupler $PC_1$ is then conductive for emission, a phototransistor 32 is thus turned on, a terminal Q of a flip-flop 33 is turned on and a transistor 34 is turned on. When a transistor 34 is on, a thyristor 35 is turned on, thereby a motor actuating relay 36 operates, and thus the underwater pump is actuated to start pumping. If the water level sensor $S_2$ does not operate for some reason, and the water level keeps rising to reach the upper level $l_3$, then the water level sensor $S_3$ is turned on, a light emitting diode 37 constructing a photocoupler $PC_2$ is conductive for emission, thus a phototransistor 38 is turned on and the transistor 34 is turned on. When the transistor 34 is on, the thyristor 35 is turned on, and the motor actuating relay 36 operates. When the water level descends to reach the lower level $l_1$, the water level sensor $S_1$ is turned off and a power to the motor actuating relay 36 is cut off.

The aforementioned control circuit of the controller for an underwater pump 10 is given as one example, and the circuit configuration is therefore not limited thereto, and such a control circuit for an underwater pump for automatic alternate operation as disclosed, for example, in Japanese Patent Publication No. 61-51158 is also applicable.

As described above, according to the present invention, the following advantageous effects can be obtained.

(1) Since the controller is constituted as a separate component from the pump casing and water level sensor holding member, the pump may be set in an automatic operation or non-automatic operation simply by incorporating or removing the controller for an underwater pump on or out of the pump casing at a site. Thus, structure of a pump casing need not be changed for different operation modes of the pump and is standardized for mass production, which makes the manufacturing effective and costless.

(2) Since automatic or non-automatic operation modes can be realized by incorporating or removing the controller for an underwater pump on or out of the pump casing by single attachment at a side, a troublesome work for wiring to adapt the pump for a different operation mode will not be involved.

What is claimed is:

1. A controller for an underwater pump which operates to start and stop said pump in response to a water level detected by a water level sensor, characterized in that said controller is constituted as a separate component which comprises a watertight case, a first connector provided at a first predetermined position of said case for installation on a power connector provided on a pump casing, a second connector provided at a second predetermined position on said case, on which an external power connector is to be installed, electronic parts and units constituting a control circuit installed in said case for starting and stopping said pump in response to signals output from said water level detection sensor, and a cable watertightly derived from said case externally for electrically connecting said control circuit and said water level sensor, said controller removably installed on said pump, whereby operation of said pump may be changed from that of an automatic pump mode with said controller installed to that of a non-automatic pump mode when said controller is not installed, or vice versa.

2. A controller claimed in claim 1, wherein said power connector of said pump is constituted to have female terminal pins, and said first connector is structured to have male terminal pins adapted to be inserted in said female terminal pins of said pump.

3. A controller claimed in claim 2, wherein said male and female terminal pins are respectively fixed through a connector body consisting of a resin material watertightly fixed on said case and pump casing respectively.

4. A controller claimed in claim 1, wherein said second connector is structured to have female terminal pins, and said external power connector is constituted to have male terminal pins adapted to be inserted in said female terminal pins of said second connector.

5. A controller claimed in claim 4, wherein female terminal pins of said second connector are fixed through a connector body consisting of a resin material watertightly fixed on said case.

6. A controller claimed in claim 5, wherein said male terminal pins of said external power connector is adapted to be inserted in said female terminal pins of pump casing.

7. A controller claimed in any one of claims 1 to 6, wherein a rigid cover is put on an end collar portion of said external power connector, and said external power connector and said case are adapted to be fixed on said pump casing with bolts.

8. A controller claimed in claim 7, wherein a watertight packing is interposed between said case and said external power connector.

9. A controller claimed in any one of claims 1 to 6, wherein said water level detecting sensor is a float switch.

* * * * *